June 4, 1968
E. E. ROSS ET AL 3,386,559
APPARATUS FOR ORIENTING ELONGATED TAPERED
AGRICULTURAL PRODUCTS
Filed April 6, 1967
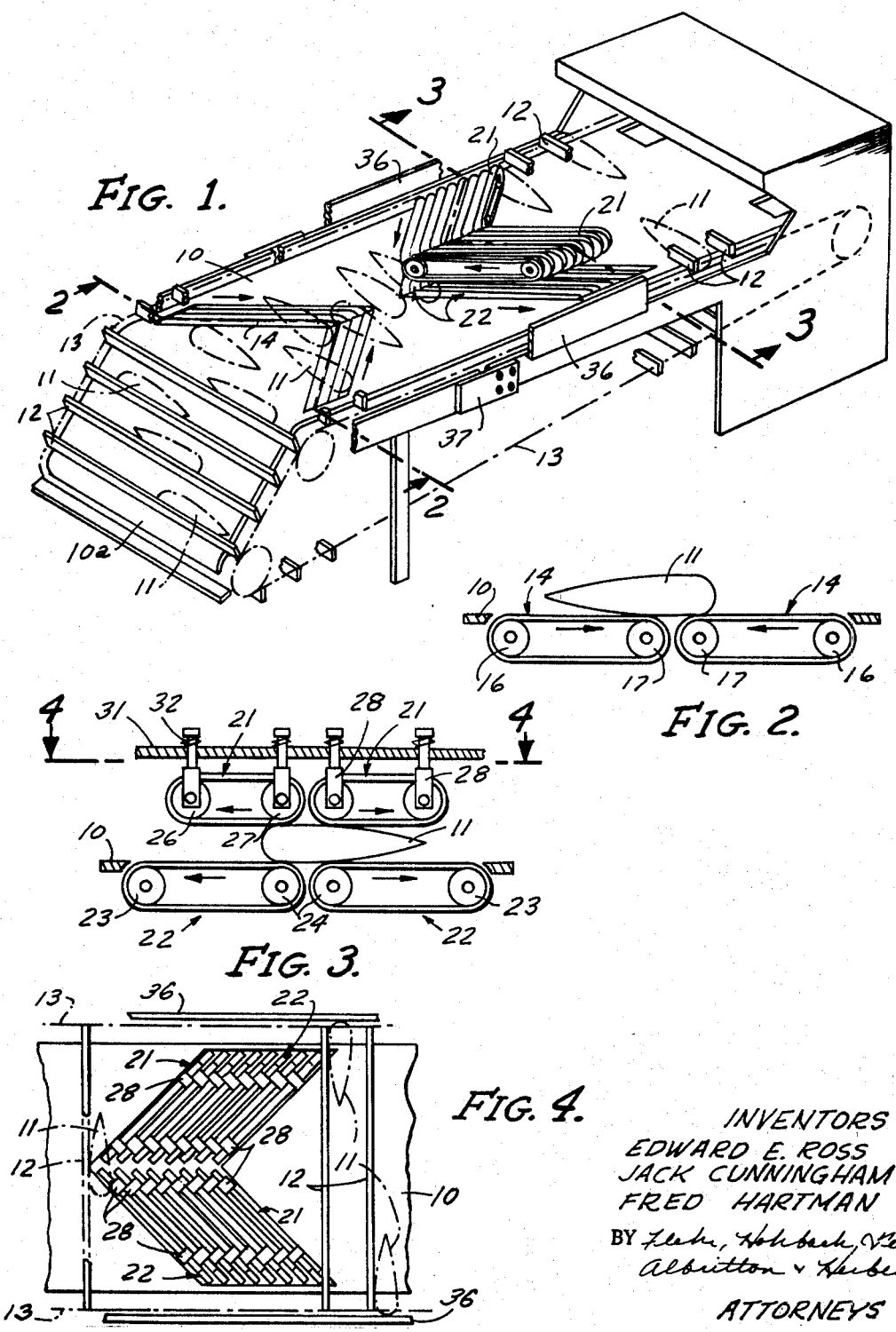
INVENTORS
EDWARD E. ROSS
JACK CUNNINGHAM
FRED HARTMAN
ATTORNEYS United States Patent Office 3,386,559
Patented June 4, 1968

3,386,559
APPARATUS FOR ORIENTING ELONGATED
TAPERED AGRICULTURAL PRODUCTS
Edward E. Ross, Lafayette, Calif., Jack Cunningham,
Pittsburgh, Pa., and Fred Hartman, Toppenish, Wash.,
assignors to California Packing Corporation, San Francisco, Calif., a corporation of New York
Continuation-in-part of application Ser. No. 394,486,
Sept. 4, 1964. This application Apr. 6, 1967, Ser.
No. 628,972
9 Claims. (Cl. 198—30)

ABSTRACT OF THE DISCLOSURE

Apparatus for orienting elongated tapered agricultural products (i.e., corn). The products are moved across the upwardly faced surface of a table with their axes lateral to the direction of conveying movement. A second conveying means arranges the products in a row at the middle of the table, and a third conveying means selectively moves the products to the sides of the table in accordance with their endwise orientation. The means for the last operation employs spaced endless belt conveyers which engage opposite sides of the products at their largest diameter ends.

---

This application is a continuation-in-part of our copending application S.N. 394,486 filed Sept. 4, 1964, and entitled, "Method and Apparatus for Orienting Tapered Agricultural Products."

This invention is related to the processing of agricultural products, and is more particularly related to an apparatus for sorting elongated tapered agricultural products such as corn, carrots, turnips, and the like.

In our aforesaid copending application S.N. 394,486, we have disclosed orienting apparatus making use of sensing means to which the products are presented one after the other, and which cooperates with take-away means for moving products of one orientation away from the other products. One form of sensing means disclosed in said application S.N. 394,486 consists of a device having presser feet which engage the products in localized regions at or near their largest diameter ends. In some instances it may be desirable to avoid use of such a sensing device as, for example, where the product is such that it may be damaged by engagement with the presser feet.

In general, it is an object of the present invention to provide novel means in apparatus of the above character for selectively separating or sorting the elongated tapered agricultural products in accordance with their endwise orientation.

Another object of the invention is to provide sorting apparatus of the above character with means for effecting separation of the products in accordance with their endwise orientation without making use of devices which press on localized regions of the products, but which on the contrary press over areas of substantial extent.

Additional objects and features of the invention appear from the following description in which the preferred embodiment has been set forth in detail in conjunction with the accompanying drawing.

The present invention employs a main conveying means which moves the elongated tapered agricultural products through a region where they are separated in accordance with their endwise orientation. The separation is effected by the use of conveying means having surfaces disposed to engage the largest diameter ends of the products on opposite sides of the same.

Referring to the drawing:
FIGURE 1 is a perspective view schematically illustrating apparatus in accordance with the present invention;
FIGURE 2 is a cross-sectional detail taken along the 2—2 of FIGURE 1;
FIGURE 3 is a cross-sectional detail taken along the line 3—3 of FIGURE 1; and
FIGURE 4 is a detail in plan taken along the line 4—4 of FIGURE 3.

Referring to FIGURE 1, our apparatus consists of a table 10 having an upper working surface that may be horizontal. Elongated tapered agricultural products such as ears of corn 11 are moved over the table by product conveying means consisting in this instance of the laterally extending parallel flights 12 attached at their ends to the indicated endless conveyer chains 13. A portion 10a of the table may be sloped downwardly to facilitate manual or automatic introduction of the ears of corn. Normally one ear of corn occupies each space between adjacent flights so that the ears are conveyed single file.

As the ears move over the table 10 they first engage conveying means 14 which serves to move the ears laterally into an aligned row at the midplane of the table. This means 14 can be referred to as converging means. In the form illustrated, the conveying means 14 consists of two sets of endless belts carried by the pulleys or sheaves 16 and 17. The belt of each set may be of the conventional V-type and are disposed side by side in the manner shown in FIGURE 1. Preferably each set of belts is disposed diagonally, whereby they converge at the center of the machine. In other words, the arrangement of each set of belts is generally in the form of a V with the apex of the V pointing in the direction of movement of the flights 12. The table 10 is cut away as illustrated in FIGURE 2 to accommodate the belts described above. The upper run of each belt is substantially coincident with the plane of the upper surface of the table. Suitable drive means is applied to the belts whereby the belts of one set is driven counter to the direction of rotation of the belts of the other set. This is indicated by arrows in FIGURE 2. When an ear of corn which is not at the center of the table is moved by the flights 12 into engagement with one of the conveying means 14, it is moved toward the longitudinal center of the table until it reaches the position shown in FIGURE 2. At this time its center of gravity is at the center of the table, and it is acted upon equally by each of the two conveying means 14. Thus, as shown in FIGURE 1, the ears of corn are arranged in a row along the center of the table, the centering being in accordance with the center of gravity of each ear.

After leaving the region of the conveying means 14 the ears of corn are brought into engagement with the conveying means 21 and 22 which can be referred to as vertically opposed sorting means. As illustrated in FIGURE 3, the conveying means 22 consists of two sets of conveyor belts, each belt being carried by the pulleys or sheaves 23 and 24. The table 10 is cut away to receive these belts whereby the upper runs of the belt provide a conveying surface coincident with the surface of the table 10. The belts forming the conveying means 22 likewise are in the form of a V as viewed in plan, the apex of the V being pointed toward the left as viewed in FIGURE 1.

The overlying sorting means 21 likewise consists of two sets of endless belts, each set comprising a plurality of belts disposed side by side and carried by the pulleys or sheaves 26 and 27. These belts are likewise arranged in the general form of a V as viewed in plan, and directly overlie the lower belts. The belts forming the upper means 21 are mounted whereby they are vertically yieldable. Thus the sheaves 26 and 27 are shown journalled to the brackets 28 which slidably extend through the indicated support 31. This suspension is provided with springs 32.

The upper and lower belts are driven by suitable means in directions as indicated in FIGURE 3. Thus these belts are arranged to provide vertically opposed spaced conveyor surfaces running from about the midplane of the table toward the sides of the table.

The sides of the machine are provided with stop rails 36 which may be carried by the frame members 37. The ears after segregation in accordance with their orientation have their butt ends in contact with the rails 36 as shown near the right hand end of FIGURE 1.

Operation of our apparatus is as follows. As previously explained, the ears of the corn are supplied one at a time to the left hand end of the machine, either manually or by suitable feed means. The ears have their axes extending laterally of the machine and parallel to each other, but without endwise orientation in that some ears have their largest diameter ends pointing in one direction, and other ears have their largest diameter ends pointing in an opposite direction. As the ears are moved into engagement with the conveying means 14, they are moved toward the center of the machine while being moved forwardly by the flights 12. As the ears move beyond the conveying means 14, their centers of gravity are substantially in alignment at the center of the table 10. When the ears enter the region of operation of the sorting conveyor means 21 and 22, the largest diameter ends are engaged at their upper and lower sides, and this engagement is effective to cause the ear to be moved in the direction pointed by its largest diameter end. The smaller end portion of the ear may initially be engaged by the corresponding upper and lower belts, but such engagement is not as effective as the engagement of the largest diameter end, and therefore the movement imparted to the ear is toward that end which is most effectively engaged.

In FIGURE 3 an ear is shown with its largest diameter end being engaged by the left hand upper and lower belts, and thus this ear will be moved toward the left. An ear having its largest diameter end pointing toward the right would be engaged by the right hand upper and lower belts, and moved toward the right.

Before the ears leave the region of the conveyer belts 21 and 22, their largest diameter ends are brought into abutment with the side rails 36. Thus the ears proceed to the rear of the machine in the manner illustrated in the right hand portion of FIGURE 1, where they can be acted upon or supplied to other processing equipment.

It will be evident that the belts 21 and 22 can be made effective to separate the ears in accordance with their orientation, without undue localized pressure. The belts provide relatively large areas which press upon the upper and lower sides of the ears, thus avoiding pressure in localized regions. Therefore damage to certain pressure sensitive products, such as fresh corn having relatively soft kernels, is avoided.

We claim:

1. In apparatus for orienting elongated tapered agricultural products, means having spaced side edges for conveying said products in a single row with the axes of the products extending lateral to the direction of conveying movement and with the ends of the products spaced from said edges, and means for engaging the products in the row and for moving the same in the direction pointed by their largest diameter ends, said last means comprising means forming two sets of conveyer surfaces with each set disposed to engage the largest diameter ends of the products on opposite sides thereof.

2. Apparatus as in claim 1 in which the conveyer surfaces are formed by spaced endless belts.

3. Apparatus as in claim 1 in which the means for moving the products in the direction pointed by their largest diameter ends consists of means forming two sets of conveyer surfaces arranged in the form of a V and disposed to engage the products on opposite sides of the same.

4. In apparatus for orienting elongated tapered agricultural products, means forming a table having an upwardly faced working surface with side edges, means for conveying said objects over the working surface with the axes of the products extending laterally of the direction of conveying movement, second conveying means for engaging said products and moving the same into a row with the ends of the products spaced from said side edges of the working surface, and third conveying means for engaging the products in the row and moving the same in the directions pointed by the largest diameter ends, said second and third conveyer means having conveyer surfaces coincident with the plane of the working surface and extending at an acute angle to the direction of movement of the first named conveying means, said third conveying means having two sets of spaced conveyer surfaces with each set adapted to engage opposite sides of the products.

5. Apparatus as in claim 4 in which said third conveyer means comprises two sets of spaced conveyer belts adapted to engage opposite sides of the products and move the same in the direction pointed by their largest diameter ends.

6. Apparatus for sorting elongated tapered agricultural products having random endwise orientation into two groups so that the products in one group are endwise oriented to point in one direction and those in the other group are endwise oriented to point in the other direction; said apparatus comprising product conveyor means substantially wider than the length of the products for advancing the products single file and extending lateral to the direction of conveyor movement but at random endwise orientation, means for converging the advancing file of products into an aligned row at the midplane of said product conveyor means and with the ends of the products spaced inwardly from the sides of the product conveyor means, and sorting conveyor means comprising laterally running conveyors on each side of the midplane of the row of products and providing vertically opposed, spaced conveyor surfaces for engaging the larger diameter ends of the products on opposite sides thereof, the spacing of said vertically opposed conveyor surfaces being such as to prevent effective engagement with the smaller diameter ends of the products, said conveyor surfaces on each side of the midplane moving in the same direction, away from those of the other set and toward the nearest side of said product conveyor means whereby the engaged large diameter ends of products are moved toward the associated side of the product conveyor means.

7. The sorting apparatus of claim 6, wherein said product conveyor means comprises a table for supporting the products and laterally extending flights advancing over the top of said table, and with adjacent flights accommodating a single product.

8. The sorting apparatus of claim 7, wherein said product converging means comprises laterally running conveyor surfaces on opposite sides of the midplane and running toward each other.

9. The sorting apparatus of claim 8, wherein said product converging surfaces form a V in plan with the apex of the V pointing in the direction of product conveyor motion.

References Cited

FOREIGN PATENTS 343,864  2/1960  Switzerland.

RICHARD E. AEGERTER, *Primary Examiner.*